(12) United States Patent
Adarshappanavar et al.

(10) Patent No.: US 8,171,379 B2
(45) Date of Patent: May 1, 2012

(54) METHODS, SYSTEMS AND MEDIA FOR DATA RECOVERY USING GLOBAL PARITY FOR MULTIPLE INDEPENDENT RAID LEVELS

(75) Inventors: Mallikarjun Adarshappanavar, Belbaum (IN); Jinto Anthony, Bangalore (IN); Jyothi M Pampaiah, Bangalore (IN); Arunkumar Havalada, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1087 days.

(21) Appl. No.: 12/032,764

(22) Filed: Feb. 18, 2008

(65) Prior Publication Data

US 2009/0210742 A1    Aug. 20, 2009

(51) Int. Cl.
*G11C 29/00* (2006.01)
(52) U.S. Cl. .................................................. 714/770
(58) Field of Classification Search .................. 714/770
See application file for complete search history.

(56) References Cited

U.S. PATENT DOCUMENTS

| | | | |
|---|---|---|---|
| 6,353,895 B1 | 3/2002 | Stephenson | |
| 7,000,143 B2 | 2/2006 | Moulton et al. | |
| 7,062,673 B2 | 6/2006 | Ng | |
| 7,080,278 B1 * | 7/2006 | Kleiman et al. | 714/6.24 |
| 7,237,062 B2 | 6/2007 | Lubbers et al. | |
| 7,904,782 B2 * | 3/2011 | Huang et al. | 714/752 |
| 2006/0242542 A1 * | 10/2006 | English et al. | 714/770 |

\* cited by examiner

*Primary Examiner* — Scott Baderman
*Assistant Examiner* — Enam Ahmed
(74) *Attorney, Agent, or Firm* — Garrana Tran LLP; Andrea E. Tran

(57) ABSTRACT

Implementations described herein generally provide methods, systems and media for recovering data from disk failures. One method generally includes calculating a global parity for a group of disks comprising multiple independent RAID (Redundant Array of Independent Disks) arrays; determining if a two disk failure has occurred within a single RAID array; and if so, recovering from the two disk failure using the global parity and data from the RAID arrays.

16 Claims, 9 Drawing Sheets

METHODS, SYSTEMS AND MEDIA FOR DATA RECOVERY USING GLOBAL PARITY FOR MULTIPLE INDEPENDENT RAID LEVELS

BACKGROUND

1. Technical Field

The present disclosure relates generally to the field of information handling systems. More specifically, but without limitation, the present disclosure relates to data storage.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some circumstances, an information handling system (IHS) may save or store data or information and may need to provide fast access to the data. Some information handling systems use a data storage system such as a redundant array of independent/inexpensive disks/drives (RAID) to provide access to data and to provide data redundancy to the users of the data. Several different types of RAID arrays exist (e.g., RAID 1-6) and each type provides a different level of data access speed and/or data redundancy.

One type of RAID array is a RAID 1 array. A RAID 1 array may contain two disk drives for storing information. In accordance with a standard RAID 1 array, the same data may be written on both disks when data is stored to a RAID 1 array. This is commonly referred to as mirroring data. By mirroring data, a RAID 1 array provides a single level of redundancy such that if a failure occurs within one of the RAID 1 drives, data can still be recovered from the other non-failed drive. The non-failed drive may be used to rebuild the failed drive after a replacement disk drive has been inserted into the RAID 1 array. However, if both disks within the RAID 1 array fail, data cannot be recovered from a RAID 1 array.

Another type of RAID array is a RAID 5 array. A RAID 5 array contains at least three disk drives. A RAID 5 array may calculate a parity value for data which is to be written to the RAID 5 array. Furthermore, a RAID 5 array may stripe the data across multiple drives (store portions or blocks of a single file on multiple drives within the RAID 5 array) and store the parity value on a separate drive than the data. In the event a disk fails in a RAID 5 array, the parity values and data values on the non-failed disks may be used to rebuild the failed drive after a replacement disk has been inserted into the RAID 5 array. However, similar to a RAID 1 array data cannot be recovered if two disk drives within a RAID 5 array fail.

Consequently, a need exists to provide data recovery from a failure of two disks in a RAID 1 array or from a failure of two disks in a RAID 5 array.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method of recovering data from disk failures. The method generally comprising: calculating a global parity for a group of disks comprising multiple independent RAID (Redundant Array of Independent Disks) arrays; determining if a two disk failure has occurred within a single RAID array; and if so, recovering from the two disk failure using at least the global parity and data from disks in the group of disks.

Another aspect of the disclosure provides a computer-readable medium containing computer executable instructions for performing a method. The method generally comprising: calculating a global parity for a group of disks comprising multiple independent Redundant Array of Independent Disks (RAID) arrays; determining if a two disk failure has occurred within a single RAID array; and if so, recovering from the two disk failure using the global parity and data from disks in the group of disks.

Yet another aspect of the disclosure provides an information handling system generally comprising: a first independent Redundant Array of Independent Disks (RAID) array; a second independent RAID array; and a RAID controller coupled to the first RAID array and to the second RAID array, and wherein the RAID controller is configured to calculate a global parity for the first independent RAID array and the second independent RAID array, determine if a two disk failure has occurred within a single RAID array, and if a two disk failure has occurred within a single RAID array, recover from the two disk failure using the global parity and data stored on the non-failed RAID array.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
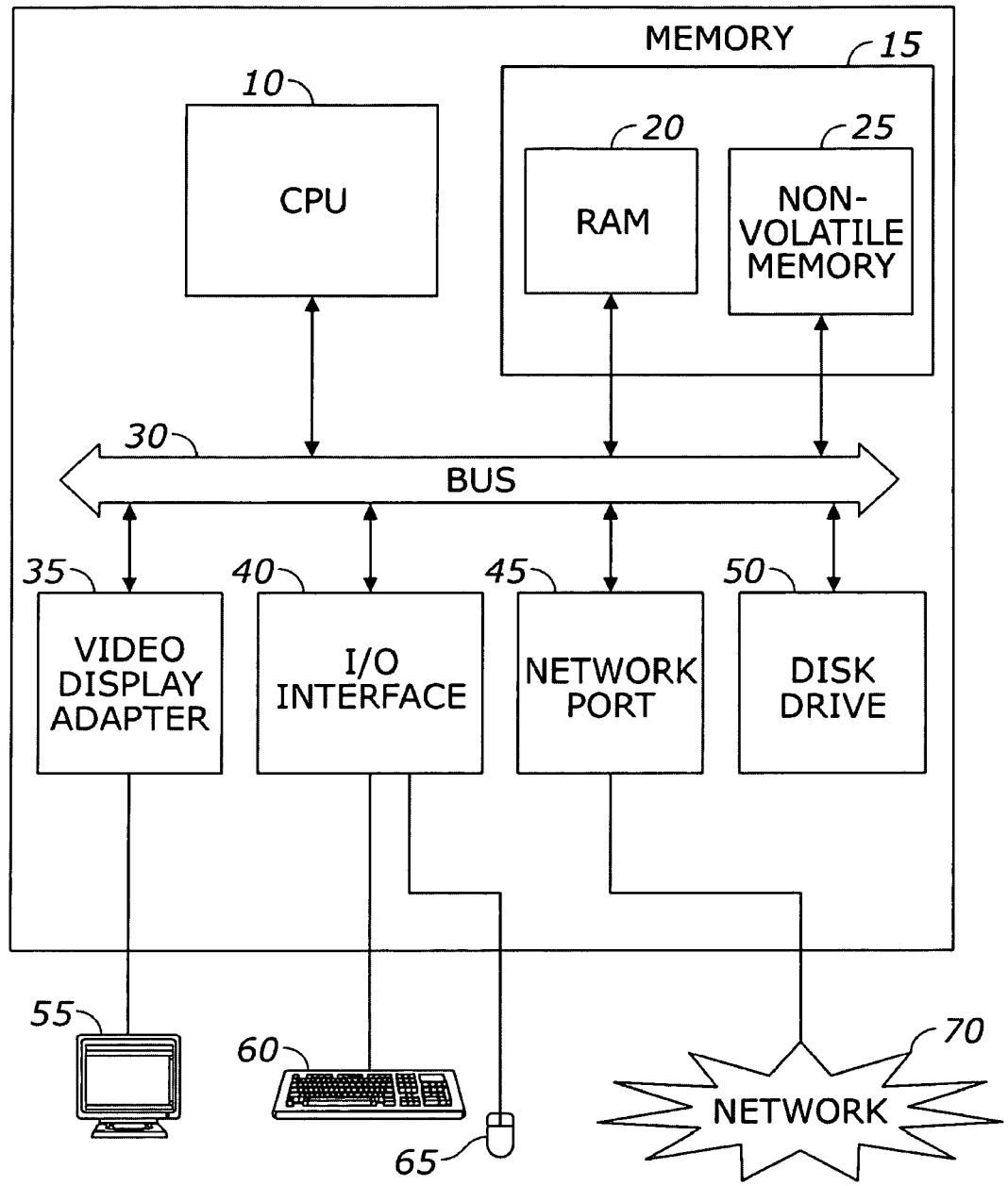
FIG. 1 illustrates an exemplary schematic of an information handling system according to the present disclosure.

FIG. 1 illustrates one possible implementation of an IHS 5 containing a CPU 10. It should be understood that the present disclosure has applicability to information handling systems as broadly described above, and is not intended to be limited to the IHS 5 as specifically described. The CPU 10 may contain a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program may contain, programming and/or executable instructions required to control a keyboard 60, mouse 65, video display 55 and/or other input/output devices not shown here. The memory may also include RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
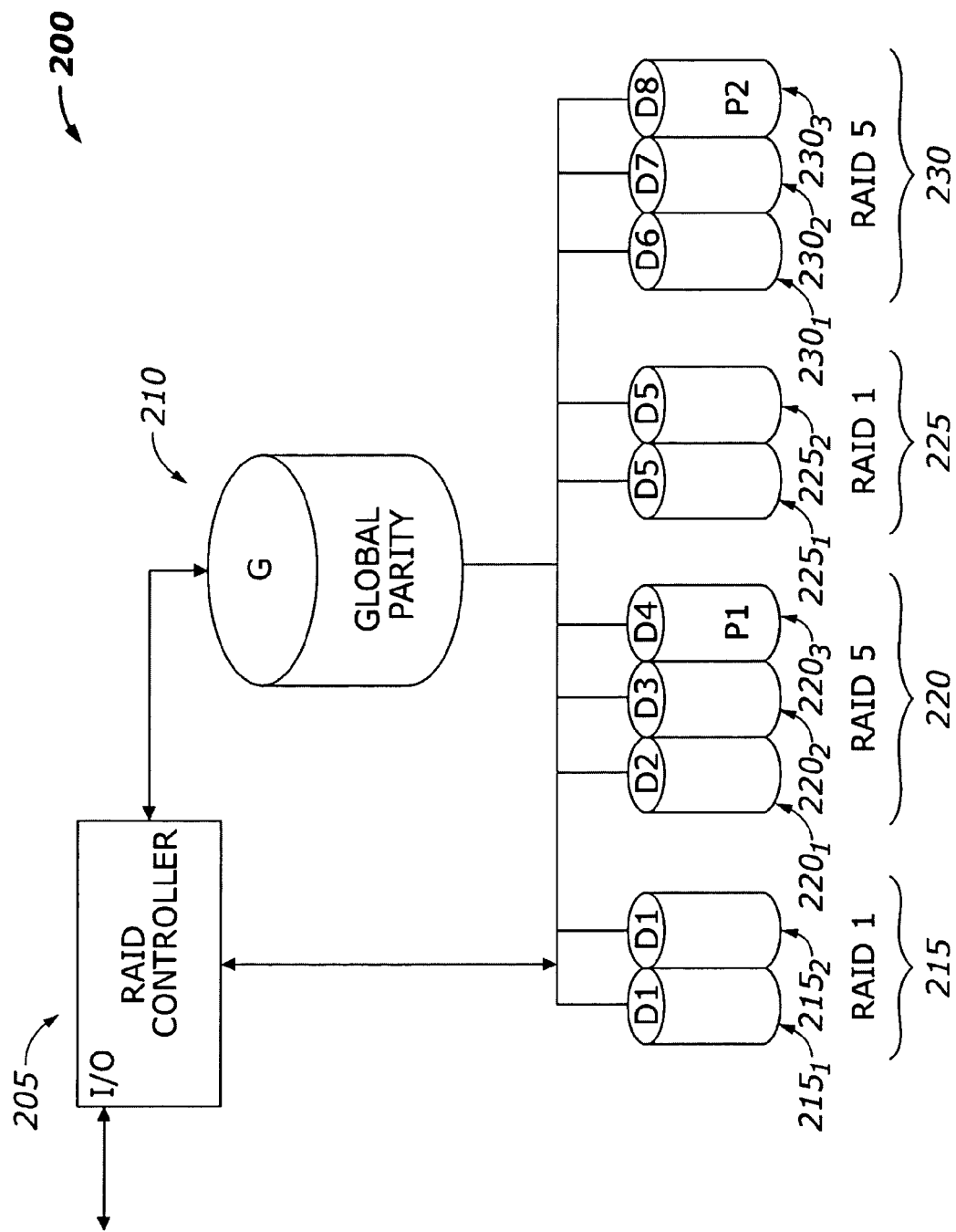
FIGS. 2, 3, and 4 illustrate exemplary data storage systems according to the present disclosure.

FIG. 2 illustrates an exemplary data storage system 200 according to the present disclosure. The data storage system 200 may be a Redundant Array of Independent/Inexpensive Drives/Disks (RAID) data storage system. As illustrated in FIG. 2, the data storage system 200 may contain a RAID controller 205, a global parity disk 210, a plurality of RAID 1 arrays (e.g., 215 and 225), and a plurality of RAID 5 arrays (e.g., 220 and 230). The data storage device 200 may be located within the same enclosure as the IHS 5 or alternatively may be located within an enclosure separate from the IHS 5 (e.g., network attached storage device).

The RAID controller 205 may be coupled to the global parity disk 210, to the RAID 1 arrays, and to the RAID 5 arrays such that the RAID controller 205 manages the communication of information to and from the global parity disk 210 and the RAID arrays (e.g., 215-230).

The RAID controller may contain hardware and software configured to manage the storage and retrieval of data from the arrays or disks within the data storage system 200. Furthermore, as illustrated by the I/O (Input/Output) label in FIG. 2, the RAID controller may be in data communication with the IHS 5 such that a user of the IHS 5 or an application running on the IHS 5 may have access to the data storage system 200. For example, the RAID controller may be electrically coupled to the system bus 30 such that the IHS 5 and the RAID controller transmit and receive information over the system bus 30. Alternatively, the RAID controller may contain hardware and software that enable the RAID controller to communicate with the IHS 5 via the network 70.

As will be described further below, the RAID controller may also contain hardware (e.g., a microprocessor) and/or software configured to calculate parity values as data is stored in the data storage system. Furthermore, the hardware and software within the RAID controller may also be configured to recover data which was present on failed disk drives using parity values and data values stored on disks drives within the data storage system.

As illustrated in FIG. 2, the data storage system 200 may contain a plurality of independent RAID arrays. For example, as illustrated in FIG. 2 the data storage system 200 may contain two RAID 1 arrays (e.g., RAID 1 array 215 and RAID 1 array 225) and two RAID 5 arrays (e.g., RAID 5 array 220 and RAID 5 array 230). However, according to aspects of the present disclosure the data storage system 200 may contain any number of RAID 1 arrays and/or RAID 5 arrays.

A RAID 1 array or set (e.g., RAID 1 array 215 and RAID 1 array 225) may contain two disk drives (e.g., $215_{1-2}$ and $225_{1-2}$) for storing information. In accordance with a standard RAID 1 array, data may be mirrored or stored on both disks such that each disk contains the same data. By mirroring data on both disks a RAID 1 array provides a single level of redundancy such that if a failure occurs within one of the RAID 1 drives, data can still be recovered from the other non-failed drive. However, a RAID 1 array does not provide redundancy if both disks within the RAID 1 array fail.

A RAID 5 array (e.g., RAID 5 array 220) contains at least three physical disk drives (e.g., $220_{1-3}$ and $230_{1-3}$). Although a RAID 5 array may contain more than three drives, at least three drives are necessary for a RAID 5 array. In a three disk RAID 5 array all drives may store data and may also store parity which is generated based on the data stored in the RAID 5 drive. As data is stored to the RAID 5 array the RAID controller 205 may distribute the data across multiple drives in the RAID 5 array and may calculate parity for the data and store the parity on a drive separate from the drives on which data was stored. According to aspects of the present disclosure, RAID 5 parity may be calculated for data using the following equation:

$$P_m = D_m + D_{m+1} \quad \text{Equation 1.}$$

In Equation 1 $P_m$ is the calculated parity value, $D_m$ is equal to the data stored on a first disk in the RAID 5 array (e.g., drive $220_1$) and $D_{m+1}$ is equal to the data stored on a second disk in the RAID 5 array (e.g., drive $220_2$). The parity equation may sum more D values if the RAID 5 array contains more than three disks.

As previously mentioned, a RAID 5 array may provide a means for data recovery if a single disk or drive fails in the RAID 5 array. A RAID controller may recover data in the RAID 5 array using the parity equation and parity values and data values on the non-failed drives within the RAID 5 array. However, in a standard RAID 5 array data cannot be recovered if two drives in the array fail.

Each of the RAID 1 arrays and the RAID 5 arrays may be represented to a user or an application executing on the IHS 5 as a single "virtual" drive. The mirroring of data in a RAID 1 array and the parity calculation and storage in a RAID 5 array may be performed by hardware and/or software in the RAID controller.

Because neither a RAID 1 array nor a RAID 5 array can recover from a two disk failure, a need exists to provide data recovery from a failure of two disks in a RAID 1 array or a failure of two disks in a RAID 5 array. The present disclosure provides devices and techniques for recovering from a two disk failure in either a RAID 1 array or a RAID 5 array. According to aspects of the present disclosure, the RAID controller may calculate a global parity value using a global parity equation and may store the global parity on a physical disk drive located within the data storage system. The disk drives on which the global parity is stored may be separate from the disk drives which make up the RAID 1 and/or RAID 5 arrays in the data storage system.

The global parity values may be calculated based on data stored in all RAID 1 and/or RAID 5 arrays within the data storage system. In the event of a two disk RAID 1 failure or a two disk RAID 5 failure, the RAID controller may use the global parity equation, the global parity values stored on the global parity drive, and data stored within the RAID 1 and/or RAID 5 disk drives within the data storage system to rebuild the information which was stored on the failed disks.

Figure 3:
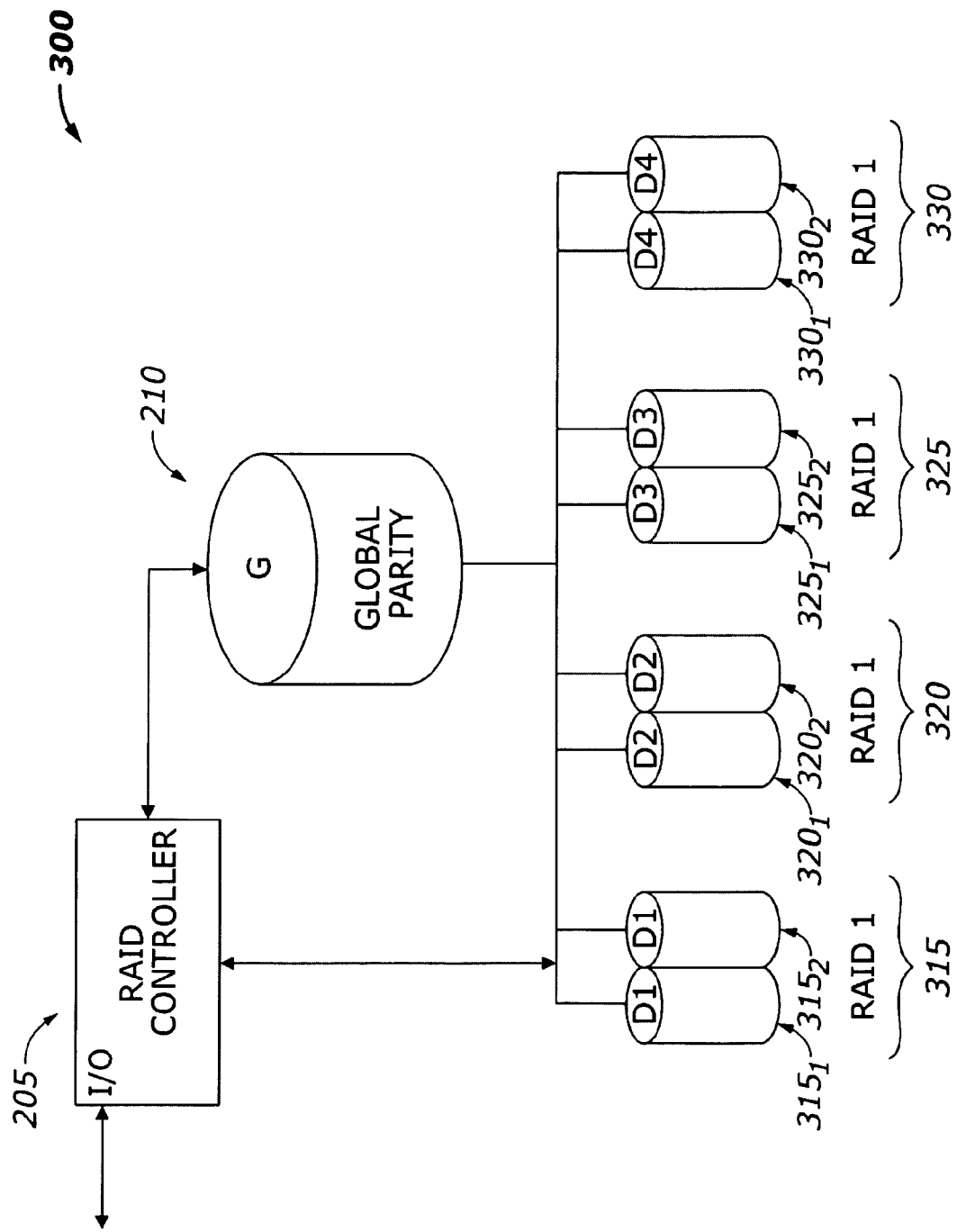

FIG. 3 illustrates another exemplary data storage system 300 according to the present disclosure. The data storage system 300 illustrated in FIG. 3 has a RAID controller 200 and a global parity disk 210 similar to the data storage system 200 illustrated in FIG. 2. Furthermore, the data storage system 300 also has a plurality of independent RAID arrays. However, in contrast to the data storage system 200 illustrated in FIG. 2, the data storage system 300 illustrated in FIG. 3 contains only RAID 1 arrays.

Specifically, the data storage system 300 contains four independent RAID 1 arrays (i.e., 315, 320, 325, and 330). In accordance with the RAID 1 specification, each RAID 1 array in FIG. 3 contains two drives (i.e., $315_{1-2}$, $320_{1-2}$, $325_{1-2}$, and $330_{1-2}$).

As will be discussed further below with regards to FIG. 5, aspects of the disclosure may calculate global parity values for the data storage system 300 based on data in each of the RAID 1 arrays and may also store the global parity values on the global parity drive 210. Furthermore, aspects of the disclosure may recover from a two disk failure in one of the RAID 1 arrays using the global parity values stored on the global parity drive 210, data stored on other RAID 1 arrays in the data storage system 300, and the global parity equation.

Figure 4:
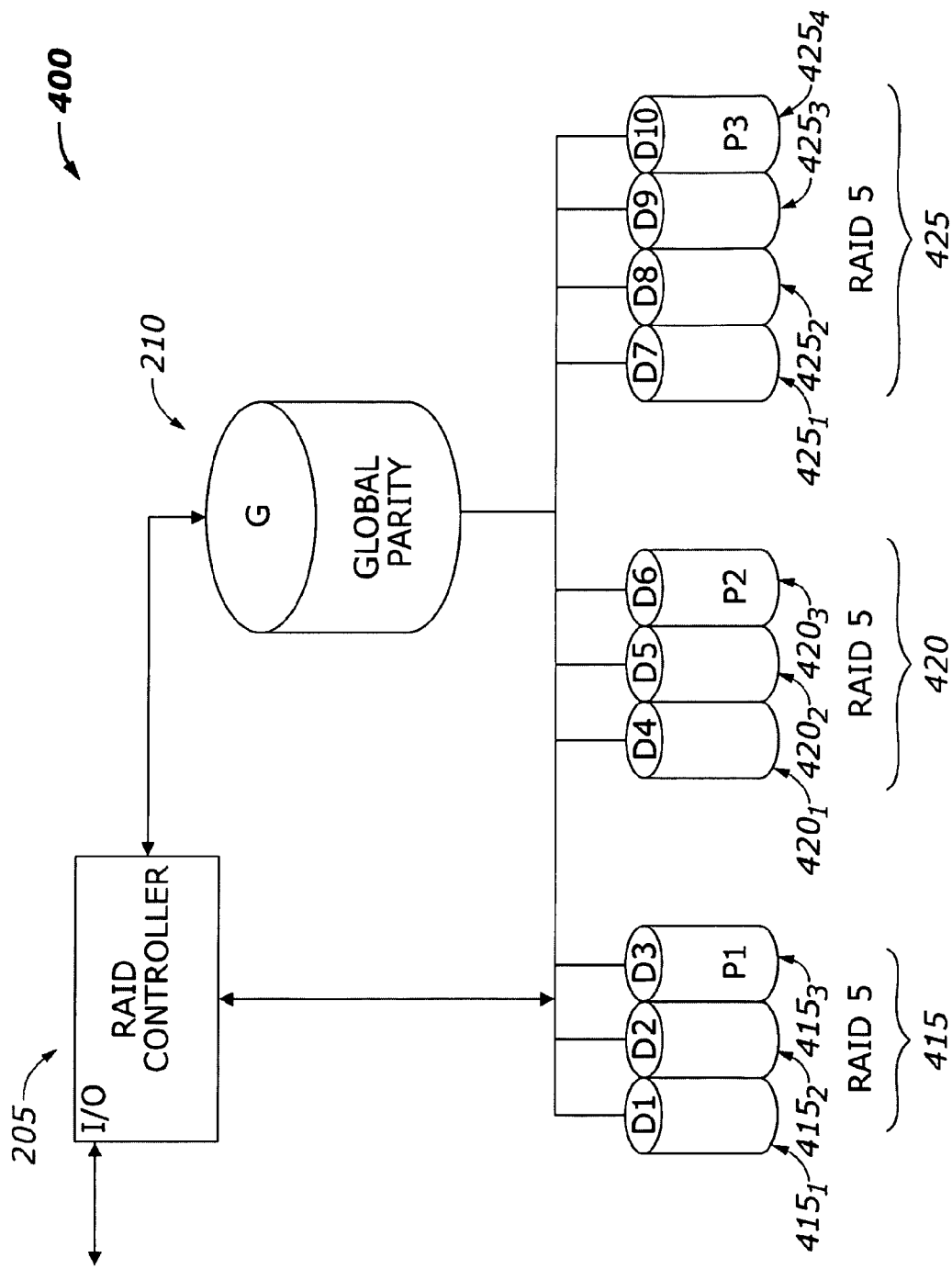

FIG. 4 illustrates yet another exemplary data storage system 400 according to the present disclosure. The data storage system 400 illustrated in FIG. 4 has a RAID controller 200 and a global parity disk 210 similar to the data storage system 200 illustrated in FIG. 2. Furthermore, the data storage system 400 also has a plurality of independent RAID arrays. However, in contrast to the data storage system 200 illustrated in FIG. 2 and the data storage system 300 illustrated in FIG. 3, the data storage system 400 illustrated in FIG. 4 contains only RAID 5 arrays.

Specifically, the data storage system 400 illustrated in FIG. 4 contains three independent RAID 5 arrays (i.e., RAID 5 array 415, RAID 5 array 420, and RAID 5 array 425). As described above, a RAID 5 configuration may properly function with at least three disk drives. For example, the RAID 5 array 415 has three disk drives (i.e., drives $415_{1-3}$) and the RAID 5 array 420 has three disk drives (i.e., drives $420_{1-3}$). However, the RAID 5 array 425 contains four disk drives (i.e., drives $425_{1-4}$).

As described above with regards to FIG. 2, when data is stored to the RAID 5 array the RAID controller may distribute the data across multiple drives in the RAID 5 array and may calculate parity for the data and store the parity on a drive separate from the drives on which data was stored. According to aspects of the present disclosure, parity for a three disk RAID 5 array may be calculated for data using Equation 1. For example, RAID 5 parity for the three disk RAID 5 array 415 may be calculated using Equation 1 (i.e., $P_1=D_1+D_2$) and RAID 5 parity may be calculated for the three disk RAID 5 array 420 using Equation 1 (i.e., $P_2=D_4+D_5$). Furthermore, for RAID 5 arrays containing more than three disk drives (e.g., RAID 5 array 425 which contains four disk drives) Equation 1 may also be used to calculate RAID 5 parity by suming more D values. For example, the RAID 5 parity for RAID 5 array 425 may be calculated using the following extension of Equation 1:

$$P_3=D_7+D_8+D_9 \quad \text{Equation 2.}$$

As will be discussed further below with regards to FIG. 5, aspects of the disclosure may calculate global parity values for the data storage system 400 based on data in each of the disks in the RAID 5 arrays. Furthermore, aspects of the disclosure may recover from a two disk failure in one of the RAID 5 arrays using the global parity values stored on the global parity drive 210, data stored on other disks in the data storage system 400, and the RAID 5 parity equation (i.e., Equation 1) and the global parity equation.

Figure 5:
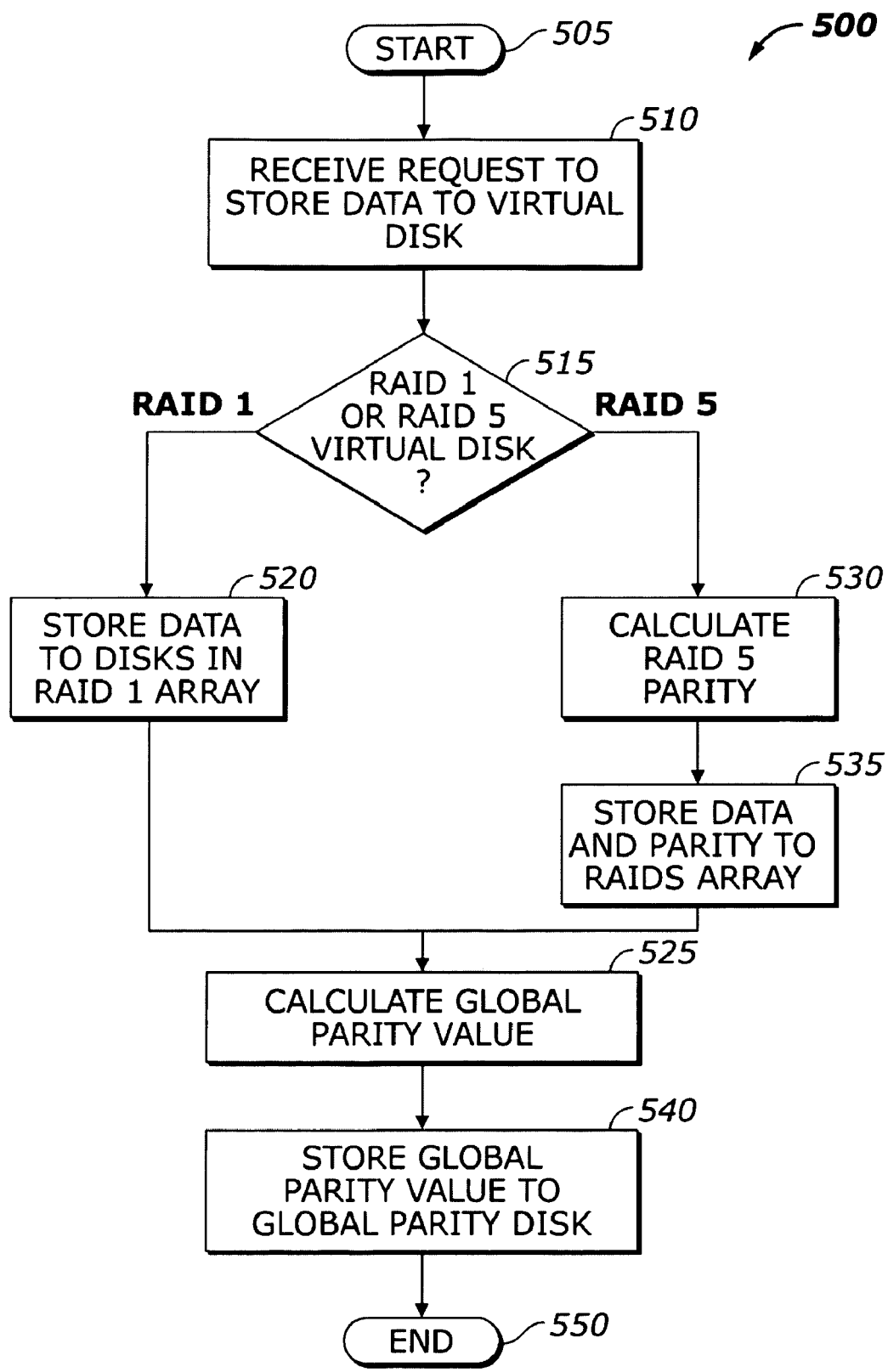
FIG. 5 illustrates an exemplary method for storing data within a data storage system according to the present disclosure.

FIG. 5 illustrates an exemplary method 500 for storing data to a data storage system according to the present disclosure. The exemplary method 500 starts at step 505, for example, when a user of or an application executing on the IHS 5 attempts to store information to a virtual drive within a data storage system (e.g., data storage system 200, 300, or 400). At step 510 the RAID controller 205 may receive a request to store data corresponding to the user's or the application's attempt to store data. Additionally, at step 510 the RAID controller may also receive the data to be stored. The RAID controller 205 may receive the request to store data and the data to be stored from, e.g., the system bus 30. The request to store data may specify a virtual drive (e.g., a specific RAID array) where the data is to be stored.

After receiving the request to store data, the RAID controller may continue to step 515 where the RAID controller 205 may determine if the request to store the data indicated that the data is to be stored in a RAID 1 virtual disk or a RAID 5 virtual disk. If the RAID controller 205 determines that the request to store data indicated a RAID 1 virtual disk, the RAID controller 205 may proceed to step 520 where the RAID controller 205 may store the received data on the two disks in the specified RAID 1 array (i.e., on the data disk and on the mirror disk). Next, the RAID controller 205 may proceed to step 525 where the RAID controller 205 may calculate a global parity value based on the received data and data stored in the data storage system. Calculation of the global parity value will be discussed further below.

If during step 515 the RAID controller 205 determines that the request to store the data indicated that the data is to be stored in a RAID 5 virtual disk, the RAID controller may proceed to step 530. At step 530 the RAID controller 205 may calculate a RAID 5 parity value for the received data. The RAID controller 205 may calculate the RAID 5 parity according to Equation 1. After calculating the RAID 5 parity for the received data, the RAID controller 205 may continue to step 535 where the RAID controller 205 may store the received data and the calculated RAID 5 parity value in the RAID 5 array. Then the RAID controller 205 may proceed to step 525 where the RAID controller may calculate a global parity value based on the received data.

According to implementations of the present disclosure, the global parity may be calculated based on a single data value from each RAID 1 array in the data storage system and as many data values as there are disk drives in the RAID 5 arrays in the data storage system. The parity calculation may be represented by the following equation derived from the Reed-Solomon equation:

$$G = g^0 D_1 + g^1 D_2 + g^2 D_3 + g^3 D_4 + g^4 D_5 + g^5 D_6 + \ldots + g^{n-1} D_n \quad \text{Equation 3.}$$

In Equation 2 G is the global parity value to be calculated, g is the generator function from the Galois Field (GF) exponent table and is equal to the integer value '2', and $D_n$ is data destined for or already present on a disk in the data storage system 200. A $D_n$ value may be present in the global parity equation for each RAID 1 array in the data storage system. Furthermore, a $D_n$ value may be present in the global parity equation for each disk drive in each of the RAID 5 arrays in the data storage system. For example, if the request to store data was destined for a virtual drive in the data storage system 200 illustrated in FIG. 2, the global parity equation would look like the following:

$$G = g^0 D_1 + g^1 D_2 + g^2 D_3 + g^3 D_4 + g^4 D_5 + g^5 D_6 + g^6 D_7 + g^7 D_8 \quad \text{Equation 4.}$$

In equation 4, D1 corresponds to data in the RAID 1 array 215, D2 corresponds to drive $220_1$ in the RAID 5 array 220, D3 corresponds to data in drive $220_2$ in RAID 5 array 220, D4 corresponds to data in drive $220_3$ in RAID 5 array 220, D5 corresponds to data in the RAID 1 array 225, D6 corresponds to data in drive $230_1$ of RAID 5 array 230, D7 corresponds to data in drive $230_2$ of RAID 5 array 230, and D8 corresponds to data in drive $230_3$ of RAID 5 array 230.

Another example of using Equation 3 to calculate a global parity may be shown with respect to the data storage system 300 illustrated in FIG. 3. For example, if the request to store data was destined for a virtual drive in the data storage system 300 illustrated in FIG. 3, the global parity equation would look like the following:

$$G = g^0 D_1 + g^1 D_2 + g^2 D_3 + g^3 D_4 \quad \text{Equation 5.}$$

In Equation 5, D1 corresponds to data in the RAID 1 array 315, D2 corresponds to data in the RAID 1 array 320, D3 corresponds to data in the RAID 1 array 325, and D4 corresponds to data in the RAID 1 array 325. Consequently, the global parity is calculated using a data value from each RAID 1 array in the data storage system 300 illustrated in FIG. 3.

Yet another example of using Equation 3 to calculate a global parity may be shown with respect to the data storage system 400 illustrated in FIG. 4. For example, if the request to store data was destined for a virtual drive in the data storage system illustrated in FIG. 4, the global parity equation would look like the following:

$$G = g^0 D_1 + g^1 D_2 + g^2 D_3 + g^3 D_4 + g^4 D_5 + g^5 D_6 + g^6 D_7 + g^7 D_8 + g^8 D_9 + g^9 D_{10} \quad \text{Equation 6.}$$

In Equation 6, D1 corresponds to data in drive $415_1$ in RAID 5 array 415, D2 corresponds to data in drive $415_2$ in RAID 5 array 415, D3 corresponds to data in drive $415_3$ in RAID 5 array 415, D4 corresponds to data in drive $420_1$ in RAID 5 array 420, D5 corresponds to data in drive $420_2$ in RAID 5 array 420, D6 corresponds to data in drive $420_3$ in RAID 5 array 420, D7 corresponds to data in drive $425_1$ in RAID 5 array 425, D8 corresponds to data in drive $425_2$ in RAID 5 array 425, D9 corresponds to data in drive $425_3$ in RAID 5 array 425, and D9 corresponds to data in drive $425_4$ of RAID 5 array 425. Consequently, the global parity is calculated using data from each disk drive in each RAID 5 array in the data storage system 400 illustrated in FIG. 4.

Returning to method 500. After calculating the global parity value, at step 540 the RAID controller 205 may store the global parity value in the global parity disk 210. As will be discussed further below with regards to FIG. 6, stored global parity values may be used to recover or regenerate data in the event of a two disk failure.

Figure 6:
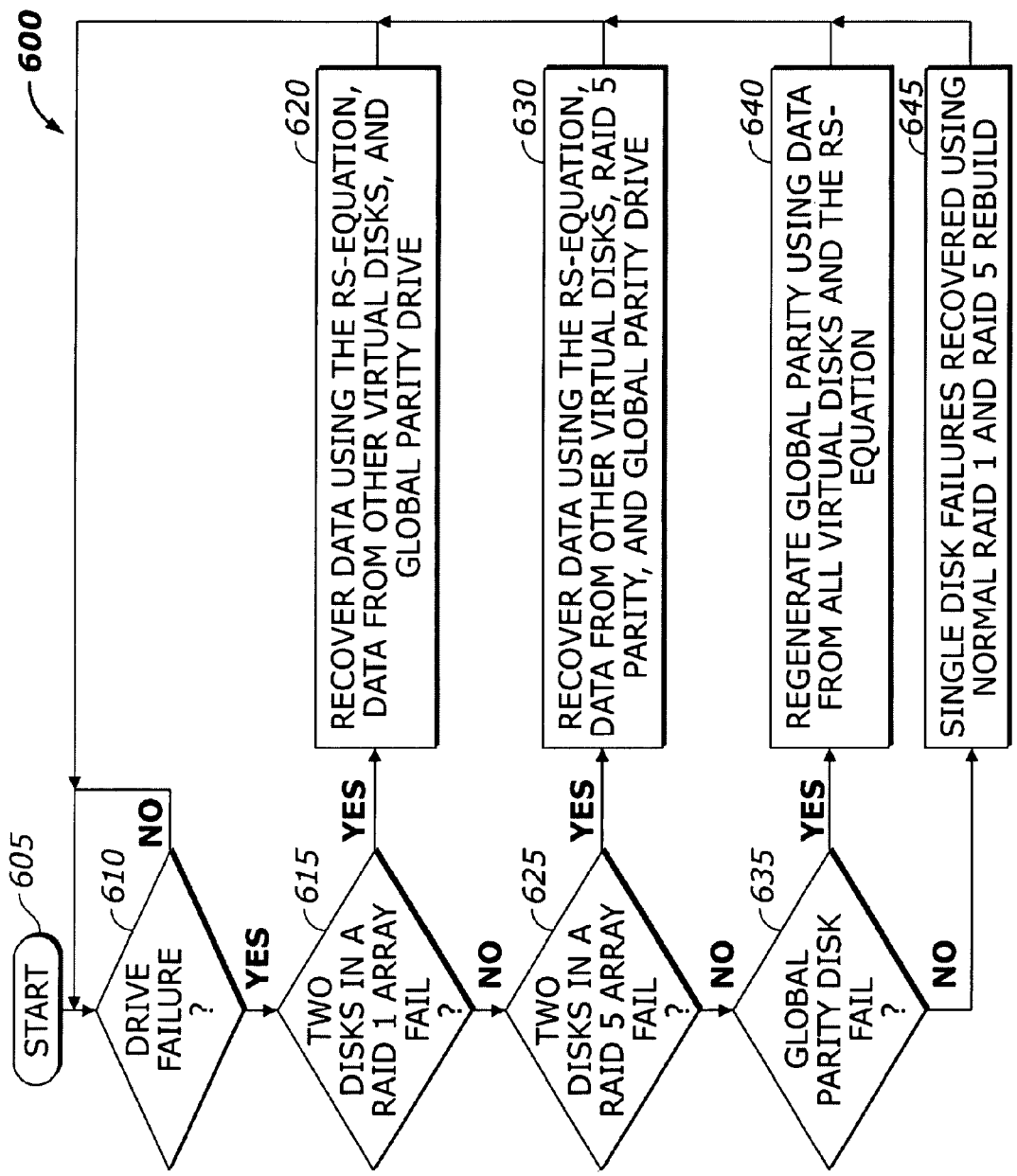
FIG. 6 illustrates an exemplary method for recovering from a disk failure within a data storage system according to the present disclosure.

FIG. 6 illustrates a method 600 for recovering from disk failures in a data storage system according to aspects of the present disclosure. Method 600 begins at step 605, for example, when a RAID controller 205 begins monitoring the status of disk drives within a data storage system. Next, at step 610 the RAID controller 205 may determine if a drive failure has occurred in the data storage system. If no drive has failed in the data storage system, the RAID controller 205 may return to step 610 and continue to monitor the status of the disk drives within the data storage system.

However, if during step 610 the RAID controller 205 determines that a drive or drives within the data storage system has/have failed, the RAID controller 205 may proceed to step 615. At step 615 the RAID controller 205 may determine if two disks within a single RAID 1 array have failed.

As mentioned above, a normal RAID 1 array cannot recover from a failure of two disks. This is because if two disks in a RAID 1 array failed, then both the data disk and the mirror disk would have failed and, consequently, the RAID 1 array's means for recovery (i.e., the mirror disk) is no longer available. However, aspects of the present disclosure provide techniques for recovery from a two disk failure within a RAID 1 array.

Figure 7:
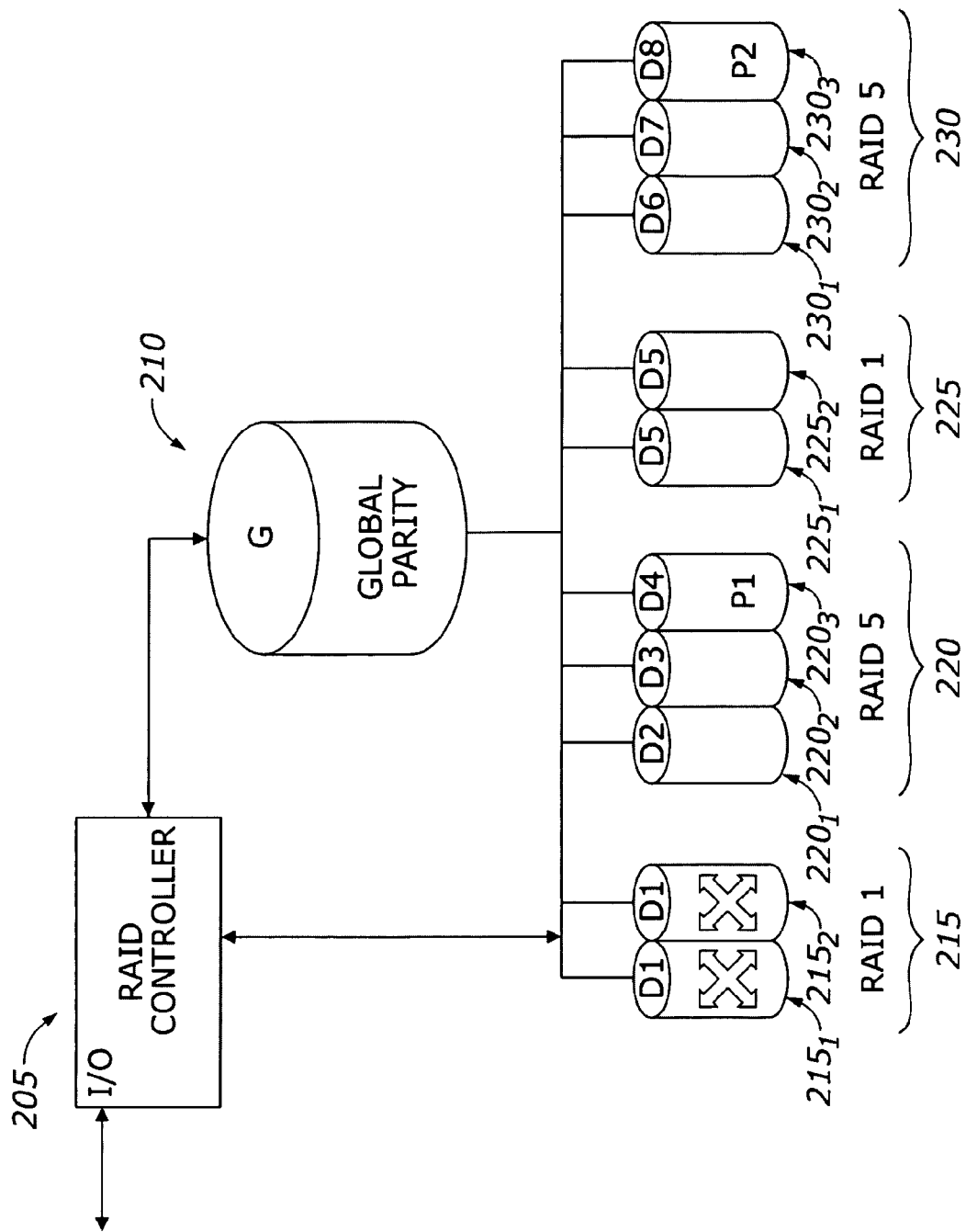
FIGS. 7, 8 and 9 illustrate exemplary disk failure scenarios within a data storage system according to the present disclosure.

FIG. 7. illustrates an exemplary failure of two disks within a RAID 1 array 215 as illustrated by the crosses over the disks. After determining that two disks in a RAID 1 array have failed the RAID controller 205 may proceed to step 620 to recover the data which was stored on the failed disks. The RAID controller 205 may recover from a RAID 1 array two disk failure after a user (e.g., an administrator) has physically replaced the failed disks. The RAID controller 205 may recover the data by rebuilding the data which was on the failed RAID 1 array using data from the other virtual disks within the data storage system (i.e., data stored in other RAID 1 arrays and data stored in other RAID 5 arrays), the global parity values stored on the global parity drive 210, and the global parity equation (i.e., Equation 3).

FIG. 7 illustrates an exemplary failure of two disks within a RAID 1 array 215. As illustrated by the crosses in FIG. 7, disk $215_1$ and disk $215_2$ within RAID 1 array 215 have failed. The two disks in the RAID 1 array 215 both contained data D1 prior to their failure. However, the data D1 may be rebuilt according to aspects of the present disclosure using the data on the other disks in the data storage system 200, the global parity G stored in the global parity disk 210, and the following equation derived from Equation 3 above:

$$g^0 D_1 = G - (g^1 D_2 + g^2 D_3 + g^3 D_4 + g^4 D_5 + g^5 D_6 + g^6 D_7 + g^7 D_8) \quad \text{Equation 7.}$$

Consequently, the data D1 which was lost when the two disks in the RAID 1 array 215 failed (i.e., disk $215_1$ and disk $215_2$) may be recovered.

Returning to FIG. 6. After the data has been recovered in step 620, the RAID controller 205 may return to step 610 to monitor the disks within the data storage system 200 for failures.

If the RAID controller determines at step 615 that two disks of a RAID 1 array have not failed, the RAID controller 205 may proceed to step 625 where the RAID controller 205 may determine if two disks in a RAID 5 array have failed.

If the RAID controller 205 determines that two disks in a RAID 5 array have failed, the RAID controller 205 may proceed to step 630 to recover the data which was stored on the failed disks. The RAID controller 205 may recover from a RAID 5 two disk failure after a user (e.g., an administrator) has physically replaced the failed disks. The RAID controller 205 may recover the lost data using the RAID 5 parity equation (i.e., Equation 1) and the global parity equation (i.e., Equation 3), data from other virtual disks (RAID arrays) within the data storage system, RAID 5 parity data from the non-failed disk in the RAID 5 array which experienced the two disk failure, and global parity data values on the global parity drive 210.

Figure 8:
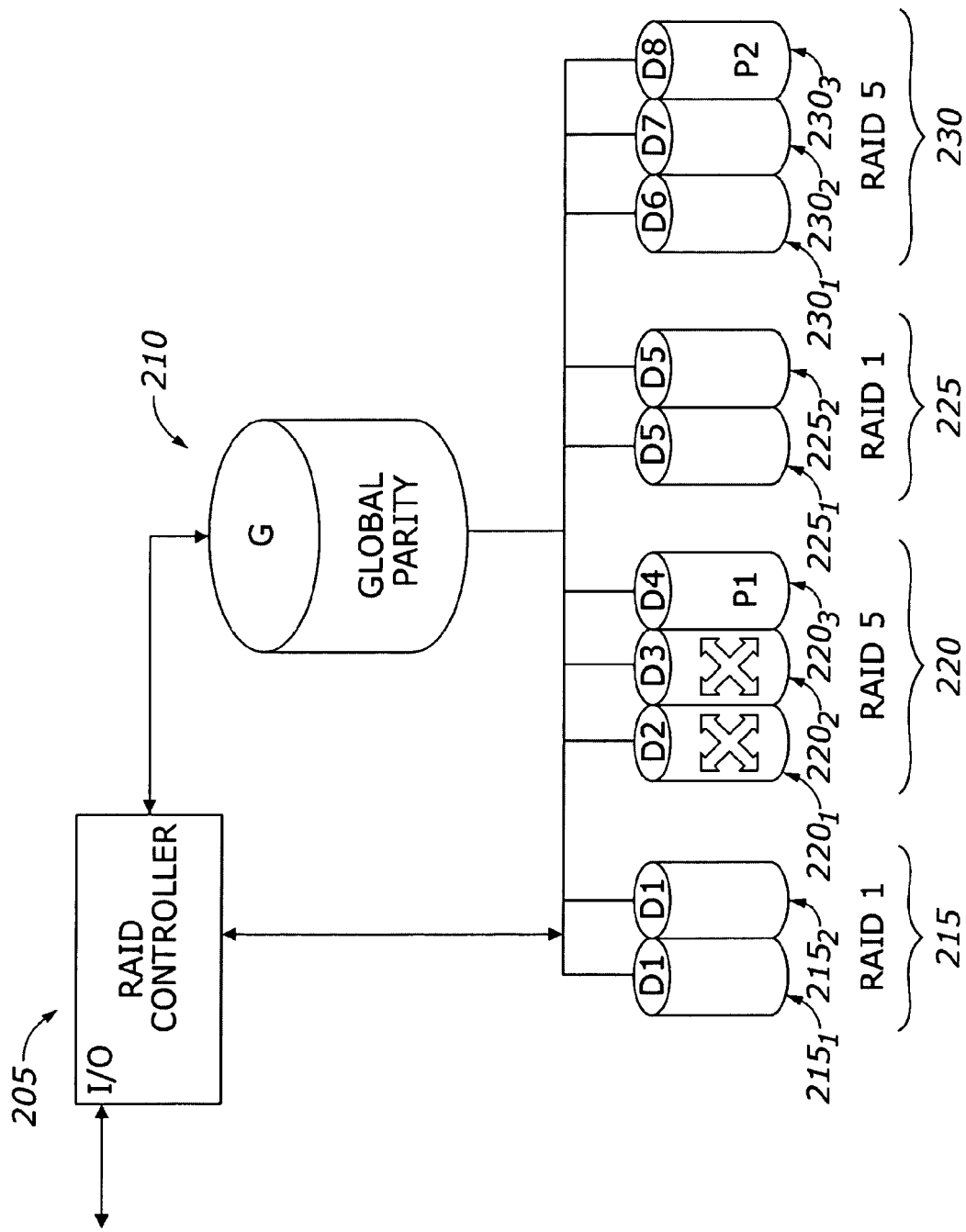

FIG. 8 illustrates an exemplary failure of two disks within a RAID 5 array 220. As illustrated by the crosses over the disks in FIG. 8, disk $220_1$ and disk $220_2$ within RAID 5 array 220 have failed. The two disks in the RAID 5 array 220 contained data D2 and D3 prior to their failure. Consequently, data D2 and D3 may not be accessed from disk $220_1$ and disk $220_2$. However, according to aspects of the present disclosure the data D2 and D3 may be recovered using the data on the other virtual disks in the data storage system 200 (i.e., D1, D4, D5, D6, D7 and D8), RAID 5 parity from the non-failed disk in the RAID 5 array 220 (i.e., disk $220_3$), the global parity G stored in the global parity disk 210, and the following equations derived from the RAID 5 parity equation (i.e., Equation 1) and the global parity equation (i.e., Equation 3):

$$g^1D_2g^2D_3 = G - (g^0D_1 + g^3D_4 + g^4D_5 + g^5D_6 + g^6D_7 + g^7D_8) \text{ Equation 8, and}$$

$$D_2 + D_3 = P \quad \text{Equation 9.}$$

Consequently, the data (D2 and D3) which was lost when the two disks in the RAID 5 array 220 failed (i.e., disk $220_1$ and disk $220_2$) may be recovered.

Returning to FIG. 6. After the RAID controller 205 is finished recovering the data in the failed RAID 5 array, the RAID controller 205 may return to step 610 to monitor the disks in the data storage system for failures.

However, if during step 625, the RAID controller 205 determines that two disks in a RAID 5 array have not failed, the RAID controller 205 may proceed to step 635 to determine if the global parity disk 210 has failed. If the RAID controller 205 determines that the global parity disk 210 has failed, the RAID controller 205 may proceed to step 640 to recover from the global parity disk failure. The RAID controller 205 may recover from the global parity disk failure after a user (e.g., an administrator) has physically inserted the failed global parity disk. The RAID controller 205 may recover from the global parity disk failure by regenerating the global parity values using the data from all of the virtual disks and the global parity equation (i.e., Equation 3).

Figure 9:
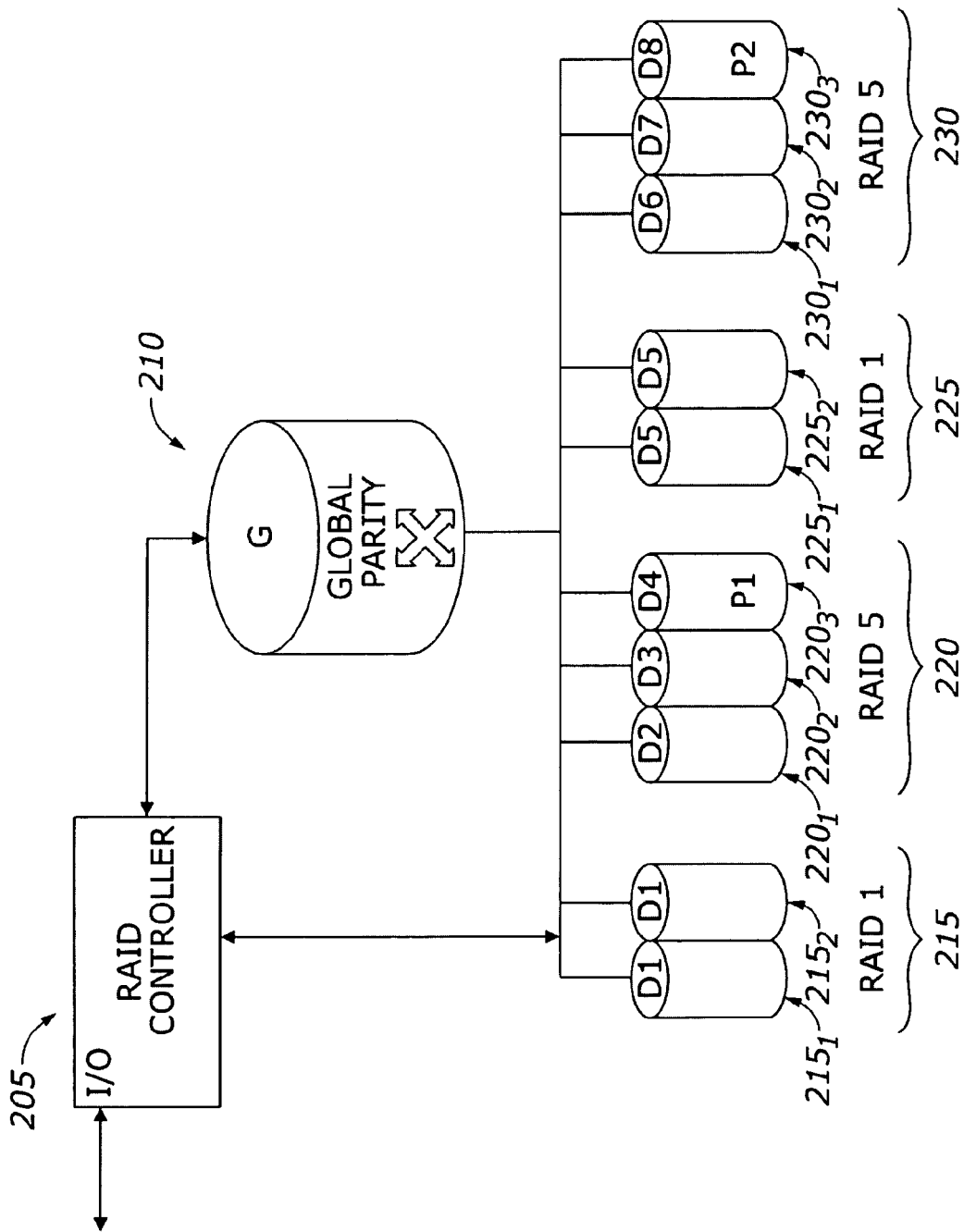

For example, FIG. 9 illustrates a failure of the global disk 210 in the data storage system 200. The global parity values may be regenerated using data on the RAID arrays in the data storage system 200 and the equation:

$$G = g^0D_1 + g^1D_2 + g^2D_3 + g^3D_4 + g^4D_5 + g^5D_6 + g^6D_7 + g^7D_8 \quad \text{Equation 10.}$$

Consequently, the global parity values may be regenerated and saved on the replacement global parity disk. Therefore, the data storage system 200 may again be protected from two disk failures.

However, if during step 635 in FIG. 6, the RAID controller 205 determines that the global parity disk has not failed, a single disk failure may have occurred and the RAID controller 205 may proceed to step 645. At step 645 the RAID controller 205 may recover any lost data due to a single disk failure using the normal RAID 1 rebuild if a RAID 1 disk failed (i.e., copying data to a replacement disk from the non-failed disk in the RAID 1 array) or using the normal RAID 5 rebuild if a RAID 5 disk failed (i.e., regenerating the data onto a replacement disk using the data and parity on the non-failed disks in the RAID 5 array).

According to the present disclosure, the order of the terms within Equation 3 and the global parity equation may vary from data storage system to data storage system depending on the number of RAID 1 and/or RAID 5 arrays within the data storage system and the order of the RAID 1 and/or RAID 5 arrays within the data storage system.

By generating a global parity value for data according to Equation 3 when data is stored to RAID arrays within a data storage system, aspects of the present disclosure provide a means for recovering from up to two disk failures in the data storage system. Furthermore, aspects of the present disclosure allow for a recovery for up to two disk failures without the need for a Raid Level Migration (i.e., changing existing RAID arrays into different RAID levels (e.g., RAID 6)).

Portions of the present disclosure, detailed description and claims may be presented in terms of logic, software or software implemented aspects typically encoded on a variety of media including, but not limited to, computer-readable media, machine-readable media, program storage media or computer program product. Such media may be handled, read, sensed and/or interpreted by an information handling system (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method of recovering data from disk failures, the method comprising:

calculating a global parity for a group of disks comprising multiple independent Redundant Array of Independent Disks (RAID) arrays;

determining if a two disk failure has occurred within a single RAID array; and if the two disk failure has occurred within the single RAID array, recovering from the two disk failure using the global parity and data from disks in the group of disks;

wherein the multiple independent RAID arrays comprise two independent RAID 1 arrays and the global parity is calculated using $G = g^0D_1 + g^1D_2$, where G is the global parity, g is equal to an integer value '2', $D_1$ is equal to data stored on a disk in one of the two independent RAID 1 arrays, and $D_2$ is equal to data stored on a disk in the other of the two independent RAID 1 arrays.

2. The method of claim 1, wherein recovering from the two disk failure comprises recovering data stored in a RAID 1 array which experienced the two disk failure using data stored on a non-failed RAID 1 array, the global parity, and $G = g^0D_1 + g^1D_2$ where G is the global parity, g is equal to the integer value '2', D.sub.1 is equal to the data stored on a disk in one of the two independent RAID 1 arrays, and D.sub.2 is equal to the data stored on a disk in the other of the two independent RAID 1 arrays.

3. The method of claim 2, wherein the multiple independent RAID arrays comprise two independent RAID 5 arrays and the global parity is calculated using $G=g^0D_1+g^1D_2+g^2D_3+g^3D_4+g^4D_5+g^5D_6$ where G is the global parity, g is equal to the integer value '2', $D_1$ is equal to data stored on a first disk in a first of the two independent RAID 5 arrays, $D_2$ is equal to data stored on a second disk in the first of the two independent RAID 5 arrays, $D_3$ is equal to data stored on a third disk in the first of the two independent RAID 5 arrays, $D_4$ is equal to data stored on a first disk in a second of the two independent RAID 5 arrays, $D_5$ is equal to data stored on a second disk in the second of the two independent RAID 5 arrays, and $D_6$ is equal to data stored on a third disk in the second of the two independent RAID 5 arrays.

4. The method of claim 3, wherein recovering from the two disk failure comprises recovering data stored in a failed RAID 5 array using data stored on the non-failed RAID 5 array, data stored in a non-failed disk in the failed RAID 5 array, the global parity, $G=g^0D_1+g^1D_2+g^2D_3+g^3D_4+g^4D_5+g^5D_6$ and $P_m=D_m+D_{m+1}$ where $P_m$ is a RAID 5 parity value, $D_m$ is equal to data stored on a first disk in the RAID 5 array and $D_{m+1}$ is equal to data stored on a second disk in the RAID 5 array.

5. The method of claim 1, wherein the multiple independent RAID arrays comprise an independent RAID 1 array and an independent RAID 5 array and wherein the global parity is calculated using $G=g^0D_1+g^1D_2+g^2D_3+g^3D_4$ where G is the global parity, g is equal to an integer value '2', $D_1$ is equal to data stored on a disk in the RAID 1 array, $D_2$ is equal to data stored on a first disk in the RAID 5 array, $D_3$ is equal to data stored on a second disk in the RAID 5 array, and $D_4$ is equal to data stored on a third disk in the RAID 5 array.

6. The method of claim 5, where determining if the two disk failure has occurred within the single RAID array comprises: determining if the two disk failure occurred within a RAID 1 array; and
   if the two disk failure occurred within the RAID 1 array, recovering from the two disk failure using at least the global parity comprises recovering data stored in a failed RAID 1 array using $G=g^0+D_1+g^1D_2g^2D_3+g^3D_4$ where G is the global parity, g is a generator function from a Galois Field exponent table, $D_1$ is equal to data stored on a disk in the at least one RAID 1 array, $D_2$ is equal to data stored on a first disk in the at least one RAID 5 array, $D_3$ is equal to data stored on a second disk in the at least one RAID 5 array, and $D_4$ is equal to data stored on a third disk in the at least one RAID 5 array.

7. The method of claim 5, wherein determining if the two disk failure has occurred within the single RAID array comprises: determining if the two disk failure occurred within a RAID 5 array; and
   if the two disk failure occurred within the RAID 5 array, recovering from the two disk failure using at least the global parity comprises recovering the data stored in a failed RAID 5 array using:
   $G=g^0D_1+g^1D_2+g^2D_3+g^3D_4$ where G is the global parity, g is a generator function from a Galois Field exponent table, $D_1$ is equal to data stored on a disk in the at least one RAID 1 array, $D_2$ is equal to data stored on a first disk in the at least one RAID 5 array, $D_3$ is equal to data stored on a second disk in the at least one RAID 5 array, and $D_4$ is equal to data stored on a third disk in the at least one RAID 5 array; and
   $P_m=D_m+D_{m+1}$ where $P_m$ is a RAID 5 parity value, $D_m$ is equal to data stored on a first disk in the RAID 5 array and $D_{m+1}$ is equal to data stored on a second disk in the RAID 5 array.

8. The method of claim 1, further comprising storing the global parity on a global parity disk separate from the group of disks.

9. The method of claim 8, further comprising:
   determining if the global parity disk failed; and
   if the global parity disk failed, recovering the global parity using $G=g^0D_1+g^1D_2+g^2D_3+g^3D_4$ where G is the global parity, g is a generator function from a Galois Field exponent table, $D_1$ is equal to data stored on a disk in a RAID 1 array, $D_2$ is equal to data stored on a first disk in a RAID 5 array, $D_3$ is equal to data stored on a second disk in the RAID 5 array, and $D_4$ is equal to data stored on a third disk in the RAID 5 array.

10. A non-transitory computer-readable medium containing computer executable instructions for performing a method comprising:
   calculating a global parity for a group of disks comprising multiple independent Redundant Array of Independent Disks (RAID) arrays;
   determining if a two disk failure has occurred within a single RAID array; and
   if the two disk failure has occurred within the single RAID array, recovering from the two disk failure using the global parity and data from disks in the group of disks;
   wherein the multiple independent RAID arrays comprise two independent RAID 1 arrays and the global parity is calculated using G=g.sup.0D.sub.1+g.sup.1D.sub.2 where G is the global parity, g is equal to the integer value '2', D.sub.1 is equal to data stored on a disk in one of the two independent RAID 1 arrays, and D.sub.2 is equal to data stored on a disk in the other of the two independent RAID 1 arrays.

11. The computer readable medium of claim 10, wherein the multiple independent RAID arrays comprise two independent RAID 5 arrays and the global parity is calculated using $G=g^0D_1+g^1D_2+g^2D_3+g^3D_4+g^4D_5+g^5D_6$ where G is the global parity, g is equal to the integer value '2', $D_1$ is equal to data stored on a first disk in a first of the two independent RAID 5 arrays, $D_2$ is equal to data stored on a second disk in the first of the two independent RAID 5 arrays, $D_3$ is equal to data stored on a third disk in the first of the two independent RAID 5 arrays, $D_4$ is equal to data stored on a first disk in a second of the two independent RAID 5 arrays, $D_5$ is equal to data stored on a second disk in the second of the two independent RAID 5 arrays, and $D_6$ is equal to data stored on a third disk in the second of the two independent RAID 5 arrays.

12. The computer readable medium of claim 10, wherein the multiple independent RAID arrays comprise an independent RAID 1 array and an independent RAID 5 array and wherein the global parity is calculated using
   $G=g^0D_1+g^1D_2+g^2D_3+g^3D_4$ where G is the global parity, g is equal to the integer value '2', $D_1$ is equal to data stored on a disk in the RAID 1 array, $D_2$ is equal to data stored on a first disk in the RAID 5 array, $D_3$ is equal to data stored on a second disk in the RAID 5 array, and $D_4$ is equal to data stored on a third disk in the RAID 5 array.

13. An information handling system, comprising:
   a first independent Redundant Array of Independent Disks (RAID) array;
   a second independent RAID array; and
   a RAID controller coupled to the first RAID array and to the second RAID array, and wherein the RAID controller is configured to calculate a global parity for the first independent RAID array and the second independent RAID array, determine if a two disk failure has occurred within a single RAID array, and if the two disk failure has occurred within the single RAID array, recover from the two disk failure using the global parity and data stored on a non-failed RAID array; wherein the global parity is calculated using data from at least the first independent RAID array and the second independent RAID array and wherein the multiple independent RAID arrays comprise two independent RAID 1 arrays and the global parity is calculated using $G=g^0D_1+g^1+D_2$ where G is the global parity, a is equal to an integer value '2', $D_1$ is equal to data stored on a disk in one of the two independent RAID 1 arrays, and $D_2$ is equal to data stored on a disk in the other of the two independent RAID 1 arrays.

14. The information handling system of claim 13, further comprising:
a global parity disk, wherein the RAID controller is configured to store the global parity on the global parity disk.

15. The information handling system of claim 14, wherein the first independent RAID array and the second independent RAID array are RAID 5 arrays; and the RAID controller is configured to calculate the global parity using $G=g^0D_1+g^1D_2+g^2D_3+g^3D_4+g^4D+g^5D_6$ where G is the global parity, g is equal to an integer value '2', $D_1$ is equal to data stored on a first disk in the first independent RAID array, $D_2$ is equal to data stored on a second disk in the first independent RAID array, $D_3$ is equal to data stored on a third disk in the first of the independent RAID array, $D_4$ is equal to data stored on a first disk in a second independent RAID array, $D_5$ is equal to data stored on a second disk in the second independent RAID array, and $D_6$ is equal to data stored on a third disk in the second independent RAID array.

16. The information handling system of claim 14, wherein the first independent RAID array is a RAID 1 and the second independent RAID array is a RAID 5 array and wherein the RAID controller is configured to calculate the global parity using $G=g^0D_1+g^1D_2+g^2D_3+g^3D_4$ where G is the global parity, g is equal to an integer value '2', $D_1$ is equal to data stored on a disk in the first independent RAID array, $D_2$ is equal to data stored on a first disk in the second independent RAID array, $D_3$ is equal to data stored on a second disk in the second independent RAID array, and $D_4$ is equal to data stored on a third disk in the second independent RAID array.

* * * * *